US012700318B2

(12) United States Patent
Poppe et al.

(10) Patent No.: US 12,700,318 B2
(45) Date of Patent: Aug. 4, 2026

(54) GUIDING AN AIRCRAFT AT AN AIRPORT

(71) Applicant: Airbus Operations GmbH, Hamburg (DE)

(72) Inventors: Andreas Poppe, Hamburg (DE); Andreas Friedel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 2 days.

(21) Appl. No.: 18/740,158

(22) Filed: Jun. 11, 2024

(65) Prior Publication Data

US 2025/0006069 A1 Jan. 2, 2025

(30) Foreign Application Priority Data

Jun. 28, 2023 (EP) .................................... 23182174

(51) Int. Cl.
*G08G 5/51* (2025.01)

(52) U.S. Cl.
CPC ..................................... *G08G 5/51* (2025.01)

(58) Field of Classification Search
CPC ........................................................ G08G 5/51
See application file for complete search history.

(56) References Cited

U.S. PATENT DOCUMENTS 6,920,390 B2 * 7/2005 Mallet ...................... G08G 5/22 340/988
9,092,976 B2 * 7/2015 Khatwa .................... G08G 5/52
2003/0160708 A1 * 8/2003 Knoop ................... G08G 5/727 340/909
2011/0196599 A1 8/2011 Feyereisen et al.
2014/0278037 A1 * 9/2014 Choksi ..................... G08G 5/51 701/120
2018/0061243 A1 * 3/2018 Shloosh ................... G08G 5/21
2022/0165169 A1 * 5/2022 Govindillam ............ G08G 5/51
2022/0343780 A1 * 10/2022 Miller ................. G06F 3/04886

FOREIGN PATENT DOCUMENTS

CN 105957404 A * 9/2016 ............... G08G 5/25
EP 2355070 A2 8/2011
EP 3764342 A1 1/2021
EP 4083965 A1 11/2022

OTHER PUBLICATIONS

European Search Report for corresponding European Patent Application No. 23182174 dated Jan. 9, 2024.

* cited by examiner

*Primary Examiner* — Steven Lim
*Assistant Examiner* — James E Munion
(74) *Attorney, Agent, or Firm* — Greer, Burns & Crain, Ltd.

(57) ABSTRACT

A method and an aircraft which utilizes information from a control tower, position information of the aircraft, and a map of an airport for guiding the aircraft along taxiways. The method may comprise receiving data representing a road map of an airport, determining a position of the aircraft, receiving data representing an assigned taxiway for the aircraft, wherein the assigned taxiway is divided into at least two sections and comprises at least one holding point. Further, data representing a taxi clearance for at least one of the at least two sections are received, wherein the data representing the assigned taxiway for the aircraft and the data representing the taxi clearance for one of the at least two sections of the assigned taxiway are received from a control tower of the airport. Then, the assigned taxiway and the taxi clearance may be indicated.

16 Claims, 3 Drawing Sheets

GUIDING AN AIRCRAFT AT AN AIRPORT

CROSS-REFERENCES TO RELATED APPLICATIONS

This application claims the benefit of European Patent Application Number 23182174.5 filed on Jun. 28, 2023, the entire disclosure of which is incorporated herein by way of reference.

FIELD OF THE INVENTION

The present invention relates to aircraft operation. In particular, the invention relates to aircraft operation at an airport between landing and gate way as well as between push back from the gate way and takeoff. Methods and systems are provided which allow for an efficient exchange of information between control tower and aircraft for guiding the aircraft at the airport.

BACKGROUND OF THE INVENTION

Typically, pilots are guided at an airport by verbal radio communication with the control tower of the airport. However, the verbal communication is prone to miscommunication which may result in critical situations, e.g., on taxiways or runways.

By the article "Defining the ATC Controller Interface for Data Link Clearances" of Dr. J. Rankin, 1998, voice recognition is suggested for air traffic controller so that the information and instructions from the control tower to an aircraft may be transmitted as text message data so as to reduce problems with miscommunication and to implement more effective processes for the air traffic controller.

However, it is still necessary that the pilot of an aircraft understands the information received from the control tower and transfers the information regarding, e.g., an assigned taxiway to a map of the airport so as to find the assigned taxiway to the gate way or back to a runway.

SUMMARY OF THE INVENTION

It may be seen as an object to provide a method and a system for automatically receiving, interpreting, presenting information from a control tower of an airport, guiding an aircraft at that airport. A solution is provided by one or more embodiments described herein.

In general, a method and an aircraft are provided which utilizes information from a control tower, position information of the aircraft, and a map of an airport for guiding the aircraft along taxiways of the airport and for preventing accidents.

According to an embodiment, a method of guiding an aircraft along a taxiway at an airport comprises the steps of receiving data representing a road map of an airport, determining a position of the aircraft, receiving data representing an assigned taxiway for the aircraft, wherein the assigned taxiway is divided into at least two sections and comprises at least one holding point. Further, data representing a taxi clearance for at least one of the at least two sections is received, wherein the data representing the assigned taxiway for the aircraft and the data representing the taxi clearance for one of the at least two sections of the assigned taxiway are received from a control tower of the airport. Then, the assigned taxiway and the taxi clearance of the at least one section on the road map of the airport may be indicated.

The data representing the road map of the airport may be received from a data storage of the aircraft or from the control tower of the airport. It will be understood that the data storage of the aircraft may provide a road map and the airport provides information regarding changes so that the road map stored by the aircraft may be updated. By receiving data representing a road map of the airport, the method gains a detailed understanding of the layout and structure of taxiways, runways, gates, and other relevant areas. This information helps in efficient navigation and prevents the aircraft from deviating from the designated paths.

The position of the aircraft may be determined by means of a global positioning system (GPS). Alternatively or additionally, the position may also be determined by other means which track the position and movement of an aircraft at the ground. By accurately determining the position of the aircraft, the method ensures that the guidance provided is specific to the aircraft's location. This allows for precise instructions and eliminates confusion or potential conflicts with other aircraft.

The method involves receiving data representing the assigned taxiway for the aircraft and the associated taxi clearance from the control tower. This information ensures that the aircraft follows the correct path and adheres to the specified instructions. Such information is typically provided to avoid congestion, collisions, and other potential hazards.

Nevertheless, the aircraft or another aircraft may deviate from the assigned taxiway. By receiving position information of other aircraft, the method enables the detection of potential conflicts. It determines changes in the positions of both the aircraft and other planes and may alert the pilots if the distance between them falls below a minimum threshold.

Alternatively or additionally, the method may extend its capability by receiving data representing the assigned taxiway and taxi clearance for other aircraft. By comparing this data with the aircraft's own assigned path and clearance, it can identify potential conflicts between the two trajectories. Alerts may be provided to the pilots to avoid such conflicts, enhancing overall safety.

The method may further comprise the step of updating relevant data, like (i) the assigned taxiway of the aircraft, (ii) the taxi clearance of the aircraft, (iii) the position information of the aircraft, (iv) the assigned taxiway of the other aircraft, (v) the taxi clearance of the other aircraft, and (vi) the position information of the other aircraft. This flexibility ensures that the guidance system remains up to date with changing conditions and instructions from the control tower, providing accurate and relevant information to the pilots.

The method may further include the ability to receive data representing target gates after landing, push back clearance, runway for takeoff, and startup clearance. By incorporating these data points, the method enhances operational efficiency, streamlines aircraft movements, and minimizes delays during taxiing, takeoff, and landing procedures.

Further, a respective confirmation may be provided to the control tower of the airport regarding the received data, such as the assigned taxiway, taxi clearance, target gate after landing, push back clearance, runway for takeoff, and startup clearance. This feedback loop ensures effective communication between the aircraft and the control tower, reducing the chances of misunderstandings or errors.

The method may further comprise the step of automatically adapting a movement speed and/or movement direction of the aircraft depending on the received data. In particular, it may be of interest to automatically control maneuvers of the aircraft in case of emergency. Assuming that a pilot loses the ability to control an aircraft which still moves on the ground of an airport, another aircraft may be controlled so as to stay out of way. Such automatic control may utilize information both directly from the un-controlled aircraft and from the control tower.

The method may also provide information about various conditions related to taxi lights, taxiway surfaces, closed sections of taxiways, temporarily blocked taxiways, closed runways, and temporarily blocked runways. This data allows the pilots to make informed decisions, be aware of potential obstacles or maintenance activities, and ensures safe and efficient taxiing.

In summary, the method and aircraft discussed offer several advantages, including precise navigation, collision prevention, conflict detection, real-time updates, operational efficiency, effective communication with the control tower, adaptive movements, and awareness of airport conditions. These features contribute to safer and more efficient ground operations, reducing the risk of accidents and enhancing overall aviation operations.

The aircraft described in the given context includes means for determining its position. It also features a data processing unit that receives data representing a road map of an airport and information from the control tower. This data includes the assigned taxiway for the aircraft, which is divided into sections and may have holding points, as well as the taxi clearance for at least one of these sections.

The aircraft may be equipped with a display that visualizes its position on the road map, along with the assigned taxiway and the corresponding taxi clearance for one section.

Furthermore, the data processing unit can receive position information from other aircraft, enabling it to determine changes in aircraft positions and check if the distance between them falls below a minimum threshold. In such cases, an alert may be provided.

The data processing unit can also receive data about the assigned taxiway and taxi clearance for other aircraft, allowing it to detect conflicts between the paths and clearances of different aircraft. Alerts may be generated to inform the pilots of these conflicts.

The aircraft's data processing unit is capable of updating the received data, ensuring that the guidance system remains accurate and up to date. It can also provide confirmations to the control tower, indicating that the received data and information have been acknowledged.

Additionally, the data processing unit can automatically adjust the aircraft's movement speed and direction based on the received data, allowing for adaptive movement.

The aircraft also includes a data storage system that holds the road map data, facilitating efficient data exchange between the storage and processing units.

Overall, these features and functionalities enhance the aircraft's navigation capabilities, prevent accidents, and improve the overall safety and efficiency of operations within the airport environment.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1:
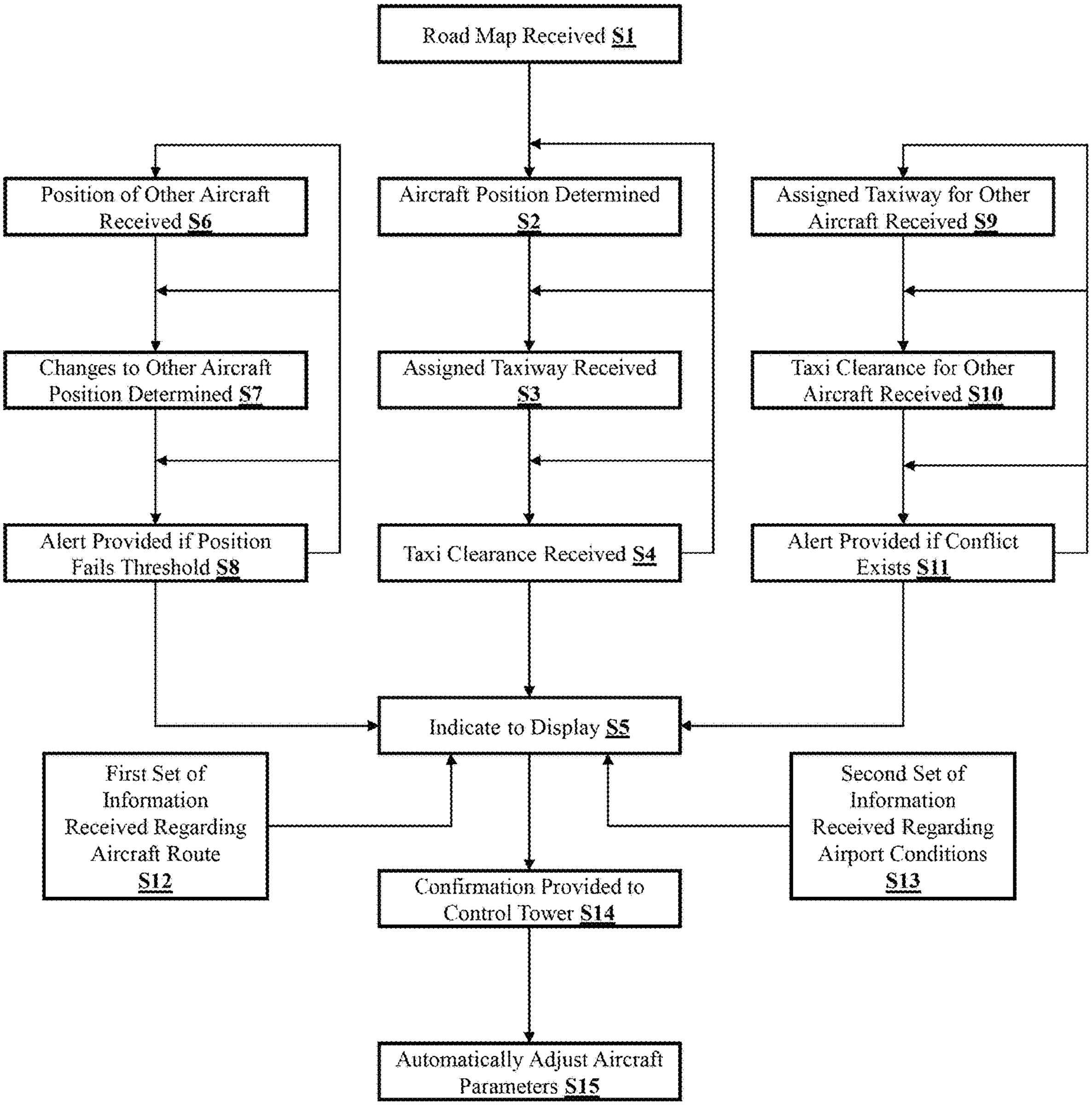
FIG. 1 is a flowchart illustrating steps of a method according to the disclosure.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

The flow-chart in FIG. 1 illustrates the principle of the steps performed in accordance with an embodiment of the disclosure. It will be understood that the steps described are major steps, wherein these major steps might be differentiated or divided into several sub-steps. Furthermore, there might be also sub-steps between these major steps. As becomes apparent from the method claims, only part of the steps according to the flow-chart may contribute to an embodiment.

A method of guiding an aircraft along a taxiway at an airport may mainly comprise steps S1 to S5 as shown in FIG. 1.

According to step S1, data representing a road map of an airport are received, wherein these data may be stored by a storage means of the aircraft or may be provided by the airport to the aircraft as basis information for navigation on the taxiways of the airport.

According to step S2, a position of the aircraft on the ground of the airport is determined.

According to step S3, data representing an assigned taxiway for the aircraft are received, wherein the assigned taxiway is divided into at least two sections and comprises at least one holding point.

According to step S4, data representing a taxi clearance for at least one of the at least two sections are received, wherein the data representing the assigned taxiway for the aircraft and the data representing the taxi clearance for one of the at least two sections of the assigned taxiway are received from a control tower of the airport.

According to step S5, the assigned taxiway and the taxi clearance of the at least one section on the road map of the airport is indicated, e.g., on a screen of the aircraft.

The arrows pointing from step S4 back to either S2, S3 or S4 indicate that the information regarding the position of the aircraft, taxiways and taxi clearance may be updated.

Steps S6 to S8 as well as steps S9 to S11 relate to aspects of collision prevention of two aircraft.

According to step S6, data representing position information of another aircraft are received, wherein the data representing position information of the other aircraft are received from the other aircraft. It may be noted that such data may be provided by the other aircraft and may be received directly from that other aircraft. Alternatively or additionally, position information of another aircraft may also be provided by the control tower of the airport.

According to step S7, changes of the position of the aircraft and of the position of the other aircraft are determined, allowing a determination whether a distance between the aircraft and the other aircraft becomes critical, i.e., tends to be less than a minimum distance.

According to step S8, an alert is provided when the distance is less than the minimum distance, i.e., when the distance falls below a predetermined threshold.

The arrows pointing from step S8 back to either S6 or S7 indicate that the information regarding the position of the other aircraft and regarding taxiways and taxi clearance of the other aircraft may be updated.

According to step S9, data are received representing an assigned taxiway for another aircraft, and according to step S10, data representing a taxi clearance for at least one section of the assigned taxiway of the other aircraft are received.

Based on a comparison of the data related to the other aircraft with the corresponding data of the aircraft, an alert may be provided in step S11, in case of a conflict between the taxiway and the taxi clearance of the aircraft and the taxiway and the taxi clearance of the other aircraft.

Again, the arrows pointing from step S11 back to either S9 or S10 indicate that the information regarding the taxiway and taxi clearance of the other aircraft may be updated.

As further information, data may be received in step S12, representing (i) a target gate after landing, (ii) a push back clearance, (iii) a runway to use for takeoff, and/or (iv) a startup clearance. Likewise, information may be provided in step S13, with respect to (i) a condition of a taxi light, (ii) a condition of a taxiway surface, (iii) closed sections of taxiways, (iv) temporarily blocked taxiways, (v) closed runways, and/or (vi) temporarily blocked runways.

It is noted that the aircraft may automatically process information received from the control tower and/or from another aircraft, and may automatically provide information to the pilot. For example, like that shown in FIG. 3, some information may be visually provided on a screen of the aircraft. The information may also be provided acoustically. For example, an alert may be provided both on the screen of the aircraft and by an acoustic signal to the pilot. All this is indicated by the arrows pointing from steps S4, S8, S11, S12 and S13 to step S5. All kind of provision of information to a pilot is meant to be covered by step S5 in FIG. 1.

According to step S14, a respective confirmation is provided to the control tower of the airport. The aircraft and/or the pilot may confirm receipt of the data representing (i) the assigned taxiway, (ii) the taxi clearance, (iii) the target gate after landing, (iv) the push back clearance, (v) the runway to use for takeoff, and (vi) the startup clearance. When automatically confirming receipt of data by the aircraft, the aircraft may communicate autonomously with the control tower as well as with other aircraft. Such an autonomous communication may implement a level of efficient exchange of information allowing a movement speed and/or movement direction of the aircraft to be automatically adapted based on the received data, for example to avoid accidents (step S15).

Figure 2:
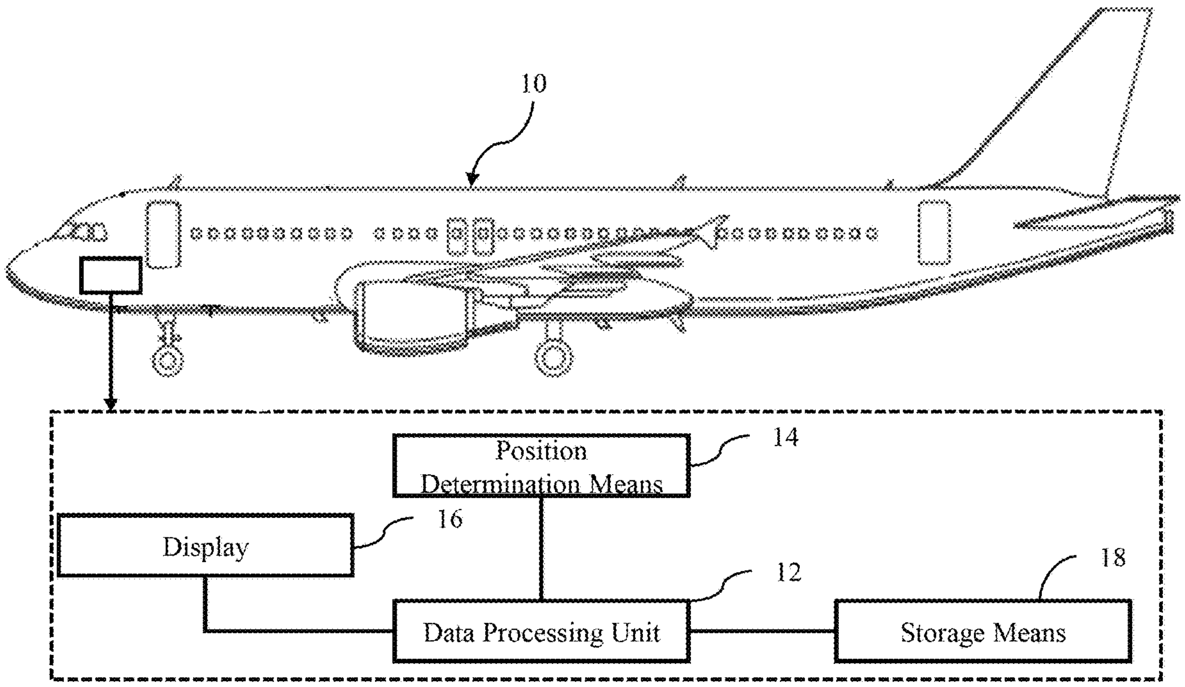
FIG. 2 schematically shows an aircraft comprising means for performing the methods according to the disclosure; and, FIG. 3 is a schematic example of an illustration on a screen of the aircraft including information in accordance with the disclosure.

FIG. 2 shows an aircraft equipped with means for performing the above-described methods. The aircraft 10 comprises a data processing unit 12, means 14 for determination of a position of the aircraft, a display or screen 16, and a storage means 18. The above-described methods may be implemented as computer program product which when executed on the processing unit 12 of the aircraft 10, causing the aircraft to perform at least some of the above-described method steps. The processing unit is coupled with the means 14, the display 16 and the storage means 18 so as to exchange data. The processing unit 12 may further be coupled with a communication antenna of the aircraft for the exchange of data with the control tower and with other aircraft.

Figure 3:
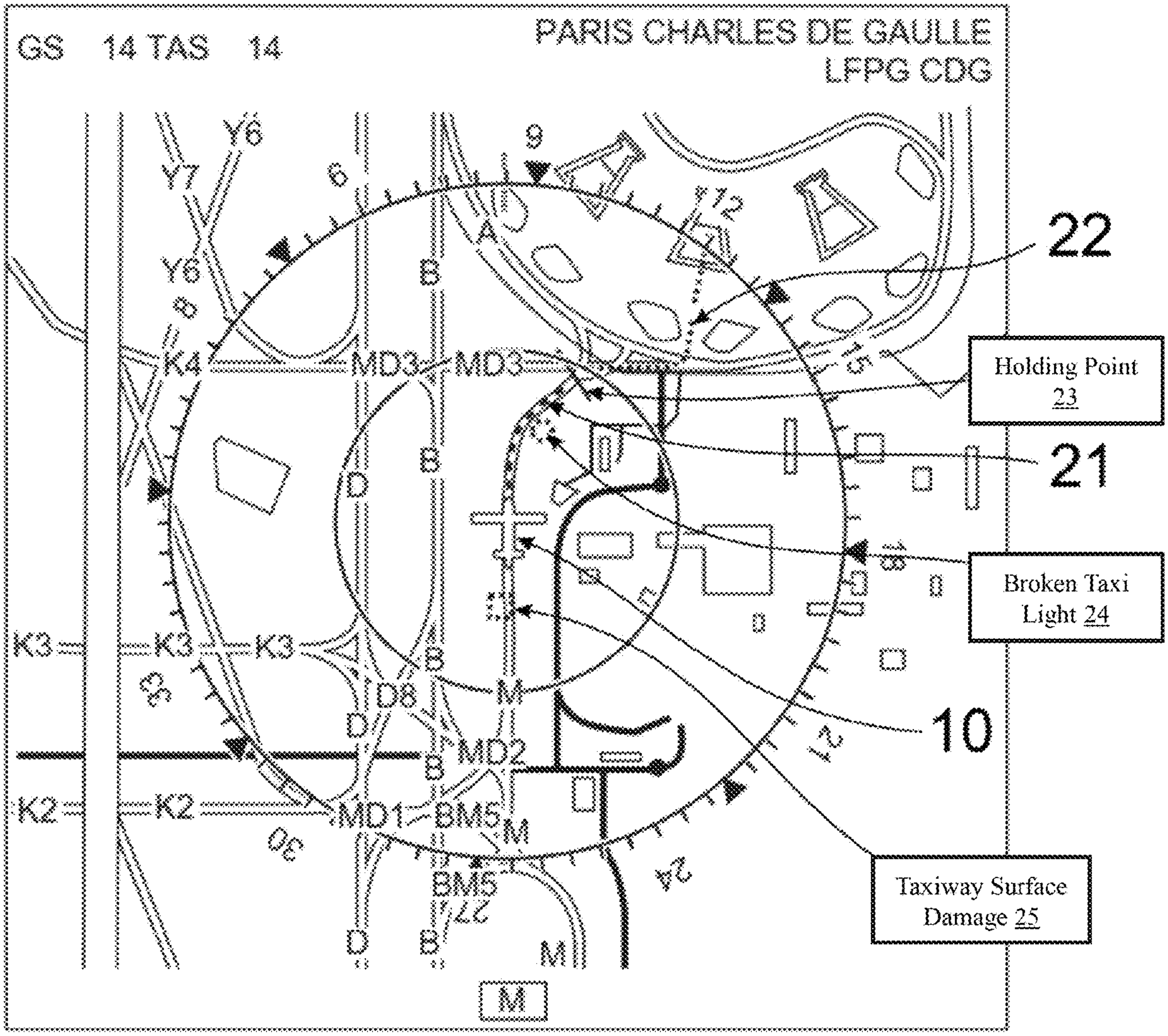

FIG. 3 shows an example of a visualization on a display or screen of an aircraft. According to this example, the aircraft 10 is already on its way between the runway and the assigned gate. The aircraft may have received data representing the assigned taxiway. Those data may include points or sections on the map which are referenced by letters and numbers. For example, the assigned taxiway may be described by the way K2, points MD1, BM5, and MD2, way M. At the current state, the aircraft 10 is on a section 21 of the taxiway which is illustrated by a dashed line, wherein this section 21 may currently have taxi clearance for the aircraft. The following taxiway 22, illustrated by a dotted line, does not yet have taxi clearance. In consequence, a holding point 23 is shown on the map. Examples of further information are a dotted square 25 which may indicate damages on the taxiway surface, and dotted circle 24 which may indicate a broken taxi light. As may be expected by a person having ordinary skill in the art, the different information may also be visualized by different colors. For example, the section 21 which already has taxi clearance may be drawn into the map in green, while the section of the taxiway 22 which does not yet have taxi clearance may be drawn in red. Information like those at points 24 and 25 may be orange and the remainder of the taxiway may be yellow.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single data processing unit or other unit may fulfil the functions of several items re-cited in the claims. The data processing unit may also be divided in several data processing units which are configured to perform parts of the method, like a first data processing unit controlling the visualization on a screen and a second data processing unit processes received data and interprets the data. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of guiding an aircraft along a taxiway at an airport, the method comprising the steps of:

receiving data representing a road map of an airport, determining a position of the aircraft, receiving data representing an assigned taxiway for the aircraft, wherein the assigned taxiway is divided into at least two sections and comprises at least one holding point delimiting each section, receiving data representing a taxi clearance for the at least two sections, wherein a first section of at least two sections has a positive taxi clearance and a second section of the at least two sections has a negative taxi clearance, the at least one holding point separating the first section from the second section, and wherein the data representing the assigned taxiway for the aircraft and the data representing the taxi clearance for one of the at least two sections of the assigned taxiway are received from a control tower of the airport, indicating the assigned taxiway and the taxi clearance of at least the first section, the second section, and the at least one holding point on the road map of the airport, and providing, automatically, a report to the control tower, the report including information selected from a group consisting of: (i) a confirmation that the assigned taxiway and the taxi clearance of at least the first section and the second section was received; (ii) a notice that the assigned taxiway and the taxi clearance of at least the first section and the second section is improper; and (iii) any combination of the confirmation or the notice independently applied to the first section and the second section.

2. The method of claim 1, further comprising the steps of:

receiving data representing position information of another aircraft, wherein the data representing position information of the other aircraft are received from the other aircraft, determining changes of the position of the aircraft and of the position of the other aircraft and determining whether a distance between the aircraft and the other aircraft is less than a minimum distance, providing an alert when the distance is less than the minimum distance.

3. The method of claim 1, further comprising the steps of:

receiving data representing an assigned taxiway for another aircraft, receiving data representing a taxi clearance for at least one section of the assigned taxiway of the other aircraft, providing an alert in case of a conflict between the taxiway and the taxi clearance of the aircraft and the taxiway and the taxi clearance of the other aircraft.

4. The method of claim 1, further comprising the step of:

updating at least one out of a group consisting of: (i) the assigned taxiway of the aircraft, (ii) the taxi clearance of the aircraft, (iii) the position of the aircraft, (iv) the assigned taxiway of the other aircraft, (v) the taxi clearance of the other aircraft, and (vi) the position information of the other aircraft.

5. The method of claim 1, further comprising the step of:

receiving data representing (i) a target gate after landing, (ii) a push back clearance, (iii) a runway to use for takeoff, and (iv) a startup clearance.

6. The method of claim 1, further comprising the step of:

providing the report to the control tower of the airport of the received data representing (i) the assigned taxiway, (ii) the taxi clearance, (iii) a target gate after landing, (iv) a push back clearance, (v) a runway to use for takeoff, and (vi) a startup clearance.

7. The method of claim 1, further comprising the step of:

automatically adapting a movement speed, a movement direction, or both of the aircraft depending on the received data.

8. The method of claim 1, further comprising the step of:

providing information with respect to at least one out of a group consisting of: (i) a condition of a taxi light, (ii) a condition of a taxiway surface, (iii) closed sections of taxiways, (iv) temporarily blocked taxiways, (v) closed runways, and (vi) temporarily blocked runways.

9. An aircraft comprising:

means for determining a position of the aircraft, a data processing unit, wherein the data processing unit is configured to receive data representing a road map of an airport and to receive data from a control tower of an airport, wherein the data from the control tower represent an assigned taxiway for the aircraft, wherein the assigned taxiway is divided into at least two sections and comprises at least one holding point delimiting each section, and wherein the data from the control tower represent a taxi clearance for the at least two sections, wherein a first section of at least two sections has a positive taxi clearance and a second section of the at least two sections has a negative taxi clearance, the at least one holding point separating the first section from the second section, wherein the data processing unit is configured to provide, automatically, a report to the control tower, the report including information selected from a group consisting of: (i) a confirmation that the assigned taxiway and the taxi clearance of at least the first section and the second section was received, (ii) a notice that the assigned taxiway and the taxi clearance of at least the first section and the second section is improper, and (iii) any combination of the confirmation or the notice independently applied to the first section and the second section, and a display for visualizing at least the position of the aircraft, the first section, the second section, and the at least one holding point on the road map together with the assigned taxiway and the taxi clearance.

10. The aircraft of claim 9, wherein the data processing unit is further configured to:

receive data representing position information of another aircraft, wherein the data representing position information of the other aircraft are received from the other aircraft, determine changes of the position of the aircraft and of the position of the other aircraft, determine whether a distance between the aircraft and the other aircraft is less than a minimum distance, and provide an alert when the distance is less than the minimum distance.

11. The aircraft of claim 9, wherein the data processing unit further configured to:

receive data representing an assigned taxiway for another aircraft, receive data representing a taxi clearance for at least one section of the assigned taxiway of the other aircraft, and provide an alert in case of a conflict between the taxiway and the taxi clearance of the aircraft and the taxiway and the taxi clearance of the other aircraft.

12. The aircraft of claim 9, wherein the data processing unit is further configured to update received data.

13. The aircraft of claim 9, wherein the processing unit is further configured to automatically adapt a movement speed, a movement direction, or both of the aircraft depending on data received.

14. The aircraft of claim 9, further comprising:

a data storage, wherein the data storage is coupled to the data processing unit for an exchange of data, wherein the data storage is configured to provide the data representing the road map of the airport.

15. The method of claim 1, further including providing the report automatically to another aircraft.

16. The aircraft of claim 9, wherein the data processing unit is further configured to provide the report automatically to another aircraft.

* * * * *